(12) United States Patent
Delacoux

(10) Patent No.: US 8,531,572 B2
(45) Date of Patent: Sep. 10, 2013

(54) VIDEO SCREEN WITH SIDE OPENING AND INNER CONNECTIONS

(75) Inventor: Jacques Delacoux, Rueil la Gadeliere (FR)

(73) Assignee: Transvideo, Verneuil sur Avre Cedex (FR)

( * ) Notice: Subject to any disclaimer, the term of this patent is extended or adjusted under 35 U.S.C. 154(b) by 318 days.

(21) Appl. No.: 12/806,214

(22) Filed: Oct. 12, 2010

(65) Prior Publication Data

US 2011/0216234 A1 Sep. 8, 2011

Related U.S. Application Data

(60) Provisional application No. 61/353,628, filed on Jun. 10, 2010.

(30) Foreign Application Priority Data

Oct. 12, 2009 (FR) ...................................... 09 57114

(51) Int. Cl.
*H04N 5/222* (2006.01)

(52) U.S. Cl.
USPC .................................................... 348/333.01

(58) Field of Classification Search
USPC .............. 348/207.99, 333.01, 373, 374, 375, 348/333.06, 333.07; 396/535, 540, 541; 174/50, 521, 527, 528, 529, 66
See application file for complete search history.

(56) References Cited

U.S. PATENT DOCUMENTS

| | | | |
|---|---|---|---|
| 3,358,957 A | | 12/1967 | Lindenmuth |
| 5,228,584 A | * | 7/1993 | Williams, Jr. ................ 220/3.8 |
| 5,496,106 A | | 3/1996 | Anderson |
| 6,113,047 A | | 9/2000 | Wung et al. |
| 6,133,531 A | * | 10/2000 | Hayduke et al. ................ 174/67 |

(Continued)

FOREIGN PATENT DOCUMENTS

| | | |
|---|---|---|
| EP | 0642275 B1 | 3/1999 |
| EP | 1530001 A1 | 5/2005 |
| FR | 2810411 A1 | 12/2001 |
| GB | 2165684 A | 4/1986 |

OTHER PUBLICATIONS

French Search Report in French Application No. FR 0957114, mailed Apr. 7, 2010.

(Continued)

*Primary Examiner* — Nicholas Giles
(74) *Attorney, Agent, or Firm* — Nixon Peabody LLP

(57) ABSTRACT

The invention relates to a viewing screen device, including a casing (8, 18), itself including a first portion (18), a so-called front portion, and a second portion (8), a so-called rear portion, the front portion including a rear face (182) and the rear portion including a front face (82, 82'), a portion of this front face forming in the closed position a gap (90) internal to the device, delimited on one of its sides by a surface (80), a so-called connecting surface, including at least one connection (101, 102, 103) of a cable, means (830, 831) for closing or opening the casing, by moving said rear portion (8) away from or closer to said front portion (18), while maintaining both of these portions attached to each other, a side portion (83) of the casing further including at least one opening (101', 102', 103') for letting through at least one cable (14, 14', 14") intended to be connected to one of the connections (101, 102, 103).

29 Claims, 10 Drawing Sheets

(56) References Cited

U.S. PATENT DOCUMENTS

| | | | |
|---|---|---|---|
| 6,526,232 B1 | 2/2003 | Mizumura | |
| 6,753,471 B2 * | 6/2004 | Johnson et al. | 174/50 |
| 7,207,830 B2 * | 4/2007 | Conway | 439/467 |
| 7,598,452 B1 * | 10/2009 | Shotey et al. | 174/66 |
| 2001/0047126 A1 | 11/2001 | Nagai et al. | |
| 2001/0053021 A1 | 12/2001 | Delacoux | |
| 2003/0174233 A1 | 9/2003 | Onozawa | |
| 2006/0044481 A1 | 3/2006 | Schedivy | |
| 2008/0198255 A1 | 8/2008 | Kirihara et al. | |
| 2009/0101386 A1 * | 4/2009 | Schoettle | 174/66 |
| 2009/0278958 A1 | 11/2009 | Bregman-Amitai et al. | |

OTHER PUBLICATIONS

International Search Report in International Application No. PCT/EP2010/068467, mailed Jan. 27, 2011.

International Search Report in International Application No. PCT/EP2010/068036, mailed Jan. 28, 2011.

* cited by examiner

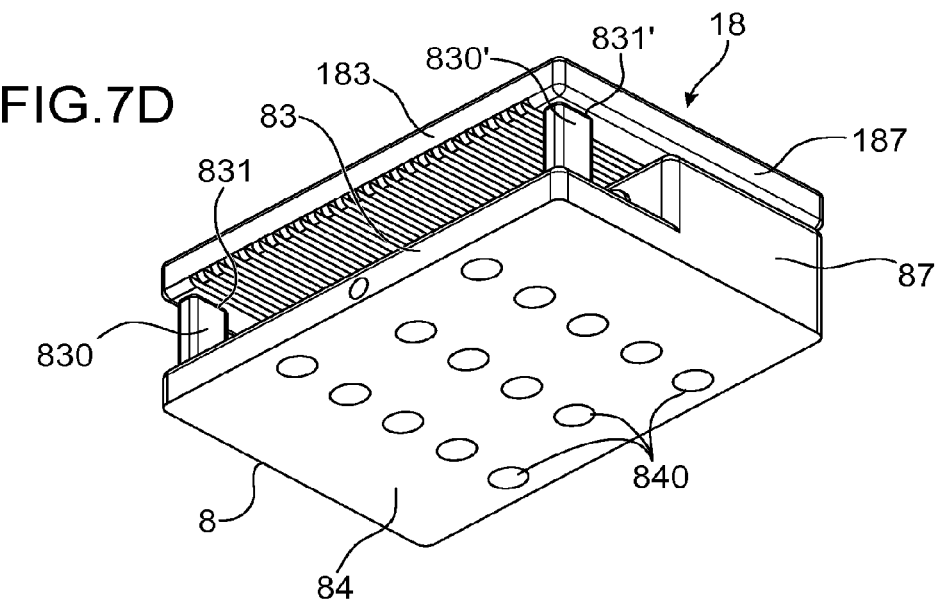
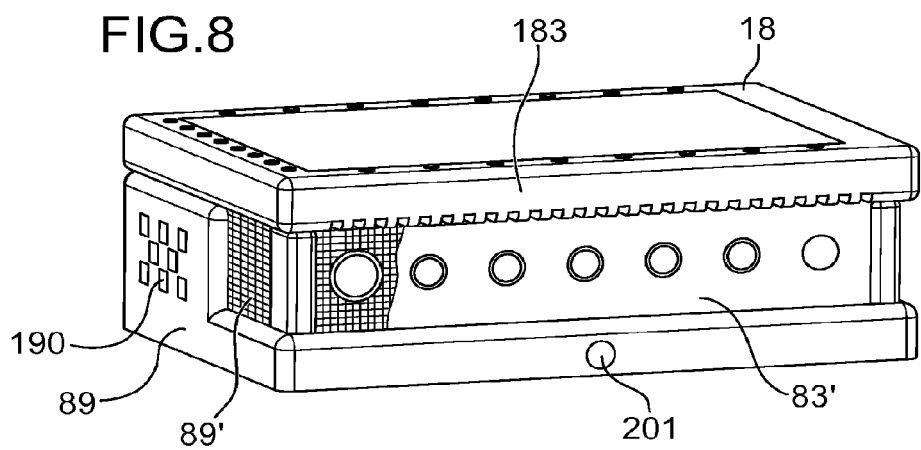

VIDEO SCREEN WITH SIDE OPENING AND INNER CONNECTIONS

CROSS REFERENCE TO RELATED APPLICATIONS

The present application claims priority to U.S. Provisional Application No. 61/353,628 filed on Jun. 10, 2010 and to French Application No. 09 57114 filed Oct. 12, 2009.

TECHNICAL FIELD AND PRIOR ART

The invention relates to the field of video screens, notably monitor screens which may be used with cameras such as those used on sites for shooting films in open air or in a studio.

FIG. 1 illustrates a standard use of such a video screen 2 coupled with a camera 4. With the camera it is possible to view a scene and to record it on a medium such as a film spool. In many cases, it is important to have an ancillary viewing screen 2, or a video screen having a monitor function, which allows viewing of the scene during the shooting.

FIGS. 2, 3A-3D schematically illustrate the outer aspect of such a video screen, reference 6 designating the viewing window and reference 8 the case of the video monitor. More specifically, FIGS. 3A, 3B and 3C are perspective views from the rear and from the top of a same screen. FIG. 3D is a top view of another type of screen.

Components of the screen housed in the case 8 are illustrated in FIG. 3C,: these are essentially signal processing cards 12, 14 and a liquid crystal matrix 16 with which the image may be formed from the signals elaborated and processed by the cards 12, 14.

The screen 2 itself is quite flat (FIG. 3A), it has connections 10, 10', 10" generally on the rear face (FIGS. 3A-3D), in order to be connected to cable(s) 14, 14', 14". These connecting means and these cables notably allow transmission of the signals from the camera 4 to the screen 2.

A screen with a particular shape may include a box 7, on the rear face of the device, as illustrated in FIGS. 3A-3C, with which side connections of the cables 14 may be made, i.e. in a plane substantially parallel to the plane of the screen.

Other types of video screens are known which do not include this kind of rear box, and for which the connection of the cables 14 is made perpendicularly to the plane of the screen, as in FIG. 3D.

Such cables 14 are also illustrated in FIG. 1, during the use of the screen. Clearly, they represent a nuisance for any operator located in proximity to the device and this all the more so, considering the rigidity of the attachment and of the radius of curvature of the cables, since they extend, according to the rear configuration of the screen, with or without any box 7, along a side direction, or along a direction perpendicular to the screen, quite widely beyond the limits of this screen, as this is understood from the diagram of FIG. 3B.

FIG. 3D illustrates the other type of screen, as a top view, with an attachment of the cables perpendicularly to the screen, and it is seen that the cable 14 has a very large extension rearwards from the screen.

Additionally, regardless of its shape on the rear face, such a screen is often provided, on the front face, beside the actual display screen, with adjustment buttons 9. The screen is further provided with adjustment buttons 9 with which the quality of the viewed image may notably be adjusted.

Now, such buttons are not inevitably always required when using such a screen. Some of them, such as for example the on/off button, are only actuated at the beginning and at the end of use. During use, for example when the screen is mounted on a camera as this is illustrated in FIG. 1, some of these buttons are not useful. The question is not only the on/off button but also certain control buttons for certain types of adjustment with which measurement tools, graphic marks for assisting positioning or further technical parameterizations of the actual monitor may be configured for example.

Both the cables and buttons pose a problem of congestion in an environment which is often limited by the room. Indeed, around the screen, and around apparatuses with which it may be associated, one or several operators may be led to move. They may be bothered in their movements, by the presence of the cables 14, 14', 14". The latter therefore pose problems of congestion and may cause possible bumping into persons or various objects.

Further, the presence of buttons 9 on the front face makes orientation or handling of the screen difficult, since the touching of already adjusted buttons should be avoided. Now, such handling operations are frequent: as this may be imagined from the diagram of FIG. 1, the screen must be able to be rotated about a vertical and/or horizontal axis, in order to orient it differently, for example for reasons of sunshine, or for showing an image to one or several persons located beside the operator.

Finally, with a concern for efficiency, certain operators prefer to have an area as devoid as possible of accessories, adjustment buttons and other switches so as to only keep the essential thing, the image on which they are working.

A problem is therefore to find a new system for positioning various accessories located around the screen 6, and notably the cables and the buttons.

Moreover, upon examining FIGS. 3B and 3D, it is understood that the cables positioned on the rear face occupy a portion of the outer rear surface of the device and only leave a small portion of the latter free. Now, it would be desirable to be able to use the whole of this surface, and in particular to add, against this rear face, ancillary devices such as for example one or several batteries. Considering the existence of the cables, the size of the batteries is necessarily limited in the present configuration.

Another type of problem on this kind of screen is that of the cooling of the electronics and of the display. A monitor screen, as the one in FIGS. 1-3D should be compact, but should further integrate means for cooling the on-board electronics. This problem is all the more important since the monitor has a screen with strong luminosity.

Now, the use of mechanical fans is prohibited in many environments because of the produced noise. Moreover, the use of perforations intended to ventilate the inside of the product would allow infiltration of liquids or dusts inside the product. It is therefore useful to have large surfaces to be used for heat dissipation by natural convection.

Still another type of problem is that of impacts and/or foulings of the connectors which may occur in the case of falling of the device: the ends of the cables and their connection means 10, 10', 10" are then not protected. They are not either protected during bad weather (rain, hail, snow . . . ).

DISCUSSION OF THE INVENTION

The invention first relates to a viewing device, including a viewing screen, a casing, means for producing an image on the screen, characterized in that:
  the casing includes a first portion, a so-called front portion, and a second portion, a so-called rear portion,
  the front portion including a rear face and the rear portion including a front face, a portion of the latter being able to be substantially or almost in contact with a portion of said rear face in a closed position of the device, and another portion of this front face forming, in this closed position, a space internal to the device, delimited on one of its sides by a surface, a so-called connecting surface, including at least one connection of a cable on this connecting surface, means for closing or opening the casing, by moving said rear portion away or closer to said front portion, while maintaining both of these portions attached to each other, a side portion of the casing further including at least one opening for letting through at least one cable intended to be connected to one of the connections.

With the invention, it is possible to shelter the connections of the cables inside the casing. This avoids problems posed by the exposure of the end of the cable in the presence of humidity or rain, as this may often be the case during outdoor use out of shelter.

Preferably, the means for closing or for opening the casing allow rotation of the front portion and of the rear portion of the casing, about an axis on one of the sides of the casing.

The means for opening and closing the casing may at least include one hinge on one of the side portions of the casing, this hinge may define an axis of rotation for opening or closing the casing.

At least one adjustment button may be positioned inside the casing and/or on a side portion of the latter.

Advantageously, the front portion includes heat dissipation means and/or the rear portion includes thermal insulation and/or heat dissipation means.

Electrical connection means between the front portion and the rear portion may be positioned in the means for opening and closing the casing.

Side portions of the rear portion may be openworked for letting through cables, or completely open.

A device according to the invention has a connection-free rear face, this rear face may therefore remove the heat in a more efficient way. The dissipation surface may moreover be increased by machining or by using an adequate profile. Further, this rear face may include means for attaching peripheral means, for example at least one battery.

One or more legs or supports may be introduced through the orifices made in the casing for the cables. Such a leg or support may be hollow and even crossed by a cable, in order to further conceal the connection means.

SHORT DESCRIPTION OF THE DRAWINGS

FIG. 1 illustrates a video screen mounted on a camera,

FIGS. 2 and 3A-3D illustrate various views of the external aspect of a video screen, from the front and from the back, FIGS. 4 and 5A-5D illustrate various views of a screen according to the invention, FIG. 6 illustrates an example of a screen according to the invention, with its cables, FIGS. 7A-7D illustrate various views of another screen according to the invention, FIG. 8 further illustrates another example of a screen according to the invention, FIG. 9 illustrates a video screen according to the invention mounted on a camera, FIGS. 10-11C illustrate alternatives of a video screen according to the invention, FIG. 12 illustrates a video screen according to the invention mounted on a U-shaped support.

DETAILED DISCUSSION OF PARTICULAR EMBODIMENTS

FIGS. 4, 5A-5C and 6 illustrate various aspects of a flat screen according to an embodiment of the present invention as well as various components which are housed therein.

The dimensions h and L illustrated in FIG. 5A depend on the size of the matrix used and are generally those which approach these dimensions the most. Generally, this screen has quite a small depth p relatively to its other dimensions in the XY plane. The depth p is variable depending on the pieces of equipment included in the monitor.

On each of these figures, it is seen that device 2 includes two portions 18, 8, so-called front and rear portions respectively, which are in the closed position in FIGS. 4, 5A and 5C. Reference 20 designates the closure line of both portions, when they are pressed onto each other. Both of these portions 8, 18 are in the open position in FIG. 5B.

With means such as a hinge 28, opening of the casing may be achieved, while maintaining both portions 8, 18 joined together through one of their sides 85, 185. The open position of the device is illustrated in FIG. 5B, in which it is also seen that one of the sides 83 of the rear portion 8 of the casing includes at least one or several openings 101', 102', 103' for letting through a cable 14, 14', 14".

The cables or electric wires and/or one or more sheaths which contain these cables or wires, further pass into the hinge 28. The electrical or electronic functions of the rear portion 8 and those of the front portion 18 may thus be connected. It is in this way that signal processing means 12 preferably as one or several electronic cards positioned in the rear portion 8, and the display means 16, 6, for example a liquid crystal matrix 16, which allows an image to be displayed from the signals elaborated by these signal processing means 12, may be electrically connected. In certain cases, there may be one or several cards in the front portion of the device. But, preferably, there are none of these cards 12 in the front portion 18 in order to reduce in proportion the needs for heat dissipation.

In FIGS. 4 and 5C, which are top and side views of the device respectively, it is seen that the rear face 84 is not congested by a box such as the box 7 of FIGS. 2-3A. It is planar, and does not include any connection for one or several cables, it may therefore be used profitably for other applications. In particular, it may be provided with means for attaching complementary piece(s) of equipment, for example a battery.

This rear face 84 of the device also forms the rear face of the rear portion 18, the front face of which consists of several surfaces designated by the references 82, 80, 82'.

The front portion 18 of the device includes a rear face 182 which, in the closed position (as in FIGS. 4 and 5C), faces the front face 82, 82' of the rear portion, and is positioned substantially parallel to the surfaces 82, 82'.

Both surfaces 82, 82' each include a plane portion positioned parallel to a plane defined by the rear surface 84, and therefore to the XY plane. But both of these plane portions are positioned at different heights along the Z axis, perpendicularly to the XY plane and also a plane defined by the rear surface 84. If the plane 84 is taken as a reference plane, the surface 82 is positioned at a height p1 while the surface 82' is positioned at a height p2<p1, for example p2=0.5 p1.

Both of these portions form a staircase step profile (see FIG. 5C), they are connected to each other through a surface 80, positioned substantially parallel to the XY plane and substantially perpendicularly to each of the surfaces 82, 82'. Along the axis X, this surface 80 is for example substantially located at half-width of the device, for example at a distance h/2 from the outer side 85 of the device, which in this example is the side on which the hinge 28 is applied. It is directed substantially perpendicularly to the surface of the screen when the device is in the closed position (again see the structure of FIG. 5C).

One of the surfaces, designated here by reference 82, is therefore the one which is located, in the closed position of the device, as close as possible to the rear face 182 of the front portion 18. In fact, it is even substantially in contact with this rear face 182, while a gap 90 is maintained between the surface 82' and the face 182.

The rear surface 84 is therefore parallel to each of the surfaces 82, 82' but also to the surface 182 when the screen is in the closed position (FIG. 5C).

The surface 80, a so-called connecting surface, is provided with one or several means 101, 102, 103, . . . for receiving cables 14, 14', 14" (see FIG. 5B) so that the latter, or at least their end portion located on the side of the means 101, 102, 103, . . . extend, when they are connected, in a plane parallel to the plane of the device. These means may be of any number, for example greater than or equal to 2 or comprised between 2 and 15, for example further 3 or 5 or 10. These means are the female portions of connectors, the male portions of which are at the end of the cables. Alternatively, these means are the male portions of connectors, the female portions of which are at the end of the cables. This surface 80 therefore actually forms a connecting area, positioned, located inside the monitor, between the front portion 18 and the rear portion 8.

In the closed position of the device, the surfaces 182, 80 and 82 define a volume or a gap 90 capable of receiving an end portion of one or several of the cables 14, 14', 14". The portion of these cables located in proximity to the means 101, 102, 103, . . . is then located in this gap 90 between the rear face 182 of the front portion and the surface 82'. The cables penetrate into the device 2 through a side face 83 of the rear portion, so as to reach below the screen when the latter is in the position of use, illustrated in FIG. 6. Preferably, this is the face opposite to the one on which the means 28 are positioned: the latter allow as indicated above both portions 8, 18 to be kept joined together through their sides 85, 185, both of these sides forming, in the closed position of the device, one of its side faces. The side face 83, through which the cables penetrate into the device 2, is opposite or substantially parallel to these sides 85, 185 and to this side face when the device is in the closed position. If the latter form the upper portion of the device during use (such as illustrated for example in FIG. 6), the face 83 through which the cables penetrate is the lower face of the device.

This arrangement allows a compact architecture without any wire positioned in a troublesome way as in FIG. 3B or 3D.

The portion 82 of the front face may be covered with a layer 93 (FIGS. 5B and 5C) of a thermally insulating material, for example in Teflon (PTFE), contributing to avoiding thermal coupling between the front portion 18 and the rear portion 8.

Alternatively, as explained later on and as illustrated in FIG. 10, this portion 82 may include a screen 930, for example of the touchscreen type, and/or a keyboard 931. Still alternatively, a screen 932, for example a touchscreen, and/or a side keyboard, may also be provided for a side outlet through one of the sides 87, 89, for example under the action of spring type means which eject this screen after being pushed by the user or unlocked by the latter. The screen is then in the open position, in a plane substantially parallel to the plane of the surface 82. This screen is illustrated in the closed position in FIG. 5D, in the open position in FIG. 11A. Two screens may be provided for a side outlet position, through each of the sides 87, 89 (FIG. 11B).

The rear face 182 of the front portion 18 may be structured with ribs 181 (FIG. 5B on which only a part of these ribs is illustrated, but also FIG. 7C) in order to form a heat dissipation surface. Cooling of this front portion which may heat up because of the electronic means and display means 16, 6 is thereby promoted. This cooling is ensured by natural convection, notably by means of the presence of the cavity or of the gap 90, without any forced mechanical ventilation: the device does not require any mechanical ventilation means.

The side faces 85, 87, 89, of the rear portion 8 are directed substantially perpendicularly to the surface of the screen in the closed position (FIGS. 5B and 5C) and control keys or buttons for adjusting functions of the screen may be positioned on these side faces. Manual adjustment means or buttons may also be positioned in the device, for example on the inner surface 82' of the rear portion.

Control buttons or keys 9 may also be positioned around the viewing surface (FIG. 6), but this is not an obligation. Only keys or buttons which an operator needs when using the device, may also be positioned on the front face, the other ones being positioned either on one or more side faces 83, 85, 87, 89 of the rear portion (like the buttons 190, 190' of FIG. 5C or of FIGS. 7A and 7B), and/or on one or more side faces 183, 187, 189 of the front portion 18 and/or on one of the surfaces 82', 182 (like the buttons 290 of FIG. 5C or FIG. 7B). Optionally no key is positioned on the front face of the front portion, all the keys being located inside the device, around the gap 90, and/or on side faces.

Closure means for maintaining both front and rear portions of the device 2 in the closed position may be positioned on the front 18 and/or rear 8 portion. For example, a portion of the front part 18 may be in a metal material while at least one of the side edges 87, 89 of the rear portion 8 is provided with magnetic means allowing both of these portions to be maintained in contact with each other. Other closure means may be achieved, for example locks or a snap-on system or any other mechanical means with which the maintaining and the cohesion of the assembly may be preserved during use, a first portion of these means being positioned on the front portion 18 of the device, a second portion on the rear portion 8 of the device, these first and second portions cooperating in order to ensure that both portions of the screen 2 are maintained in contact with each other, in the closed position, and for allowing both of these portions to be opened. The hinge 28 may be slowed down by a mechanical frictional device in order to oppose resistance to opening and to closing.

In FIGS. 7A-7D, an alternative is illustrated, in which uprights or studs 830, 830' positioned perpendicularly to the surface 82' are provided at their respective ends with a magnetic portion 831, 831', intended to cooperate with a metal portion located in the front portion 18 of the apparatus in order to attract the latter and to thereby achieve closure. The operator then only has to exert forces in directions opposite to each other, on the front portion 18, and simultaneously on the rear portion, in order to open the assembly. FIG. 7C illustrates the closing movement.

According to the alternative of FIGS. 7A-7D, the side portions 83, 87, 89 of the rear portion 8 may be openworked, or completely open. This configuration promotes cooling of the device, notably by the contact between ambient air and the rear face 182 of the front portion 18. Still according to another alternative, illustrated in FIG. 8, these side portions are not totally opened, but protected by one or more grids or walls 89', 83' in order to let through the air while filtering the particles or the dusts borne by the atmosphere and which may tend to be transported towards the inside of the device. The side wall 83' is further provided with corresponding orifices 101', 102', 103' in order to let through cables, as in FIGS. 5B, 5C.

In the lower side portion 83, a leg or support may be introduced through an orifice 201 made in the casing. Such a leg or support may be hollow, in which case a cable may be slipped into the inside.

As this is seen on these various figures, a preferred embodiment is the one in which the opening and the closing of the device are accomplished by rotating both front and rear portions, relatively to each other, about an axis defined by the hinges 28 positioned on one of the sides of the device.

In FIG. 7D, it is seen that the rear planar face 84 is preferably free of any connection or key. It may include at least one hole 840 and/or at least one threaded bore with which one or more accessories may be attached. It may be used for mechanically attaching peripheral means and/or one or several other pieces of equipment, for example one or more batteries. For example, a battery is attached with screws into a location provided for this purpose or by means of mechanical supports which will themselves be attached to the different locations provided for this purpose at the rear of the monitor. These batteries, generally quite heavy, allow stabilization of the device in certain configurations, mainly those where the monitor will act as a counterweight in a balanced self-contained system for cancelling the actions of gravity. This rear face may therefore be provided with attachment means with which the monitor may be made interdependent of a system including the camera, the means for balancing and supporting the whole, these attachment means will optionally provide the possibility of adjusting the relative position of the monitor in the system.

In a device according to the invention, as the connections of the cables are positioned inside the casing, they are notably protected from impacts and from fouling or bad weather. But also, the departures of cables are protected and guided towards the bottom of the monitor, clearing the rear face 84 which may dissipate heat for example produced by electronic components and/or provide a wide attachment area.

The monitor may equally be used in both directions, including functions for flipping over the image, which has an advantage for protecting the cables and the possibility of keeping large cooling surfaces.

Such a monitor according to the invention is intended to display images from various sources or various motion picture devices, in field applications. The apparatus is for example held in the hand, attached to a camera or onto any other motion picture shooting system, borne on the body in systems created for compensating for the effects of gravity while allowing fluid or independent displacements of the operator, like cranes or mobile systems, either motorized or not.

A monitor according to the invention may be used as explained above in connection with FIG. 1, with a camera 4. The vertical direction of the cables 14, 14', 14" no longer poses the problems of congestion and inconvenience as indicated in the introduction, as this is seen in FIG. 9.

When a device according to the invention is in its closed position (this is notably the position illustrated in FIGS. 5C, 6, 7B, 7D, 8), the front face and the screen 6 of the device and its rear face 84 are substantially parallel to each other.

In the various embodiments shown, it is possible to advantageously use the surface 82 (a surface which is part of the front face of the rear portion of the device, as already explained above) in order to position a screen 930 and/or a keyboard 931. This is illustrated in FIG. 10.

A screen 932, for example a touchscreen, and/or a side keyboard, may also be provided for a side outlet, for example under the action of spring type means which eject this screen after pushing action by the user or unlocking by the latter.

Figure 1:
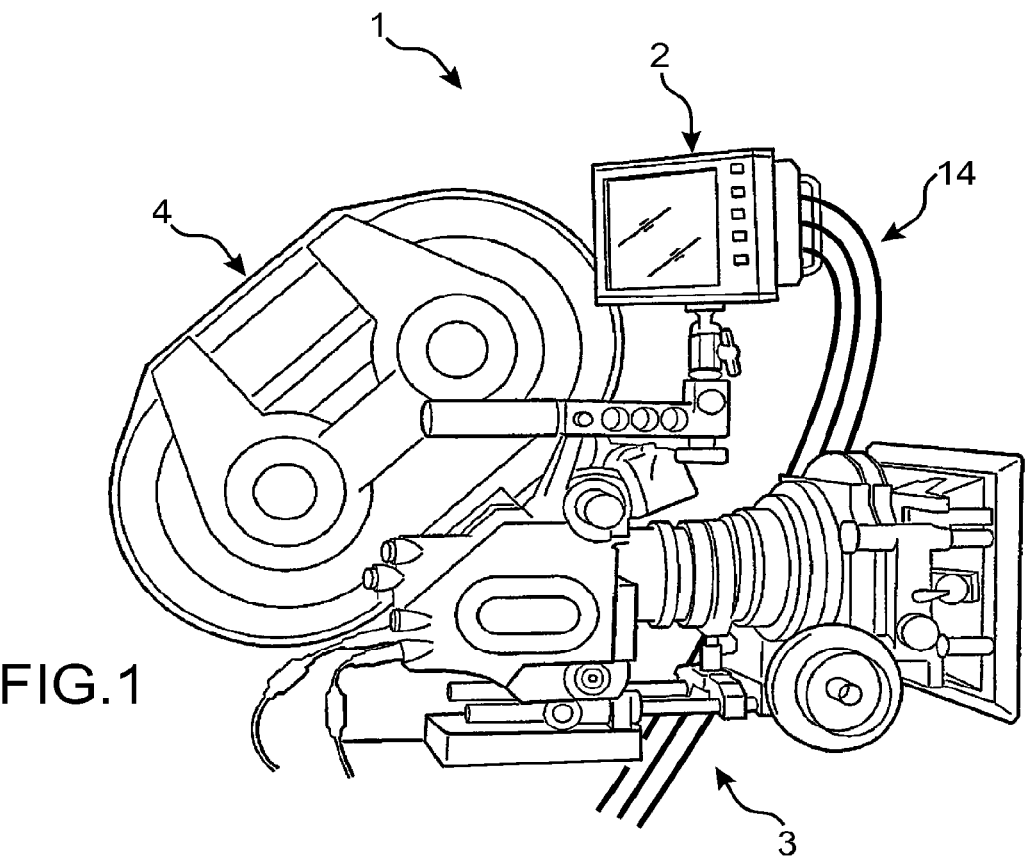
Figure 2:
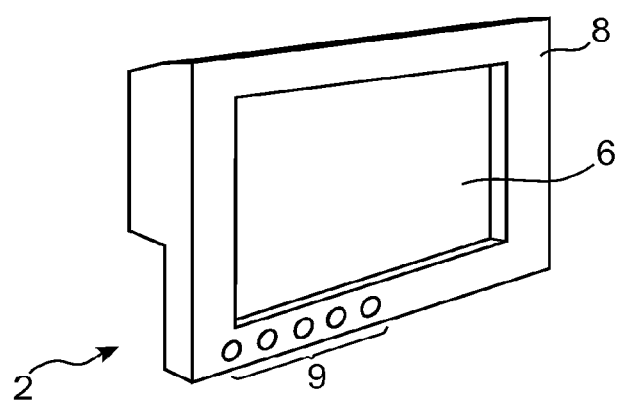
Figure 3A:
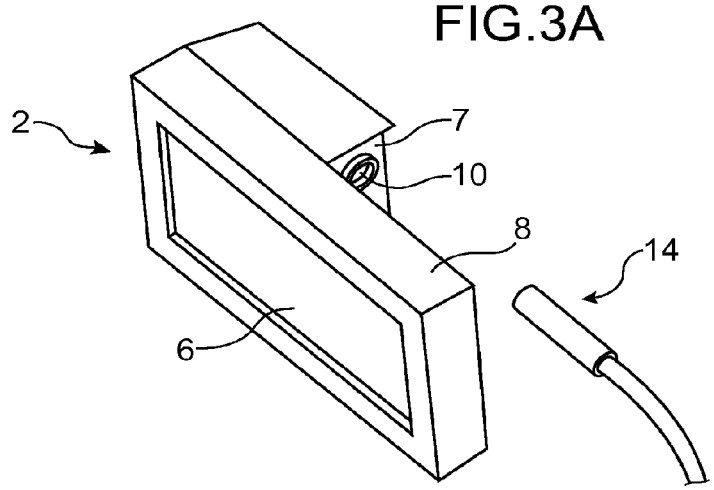
Figure 3B:
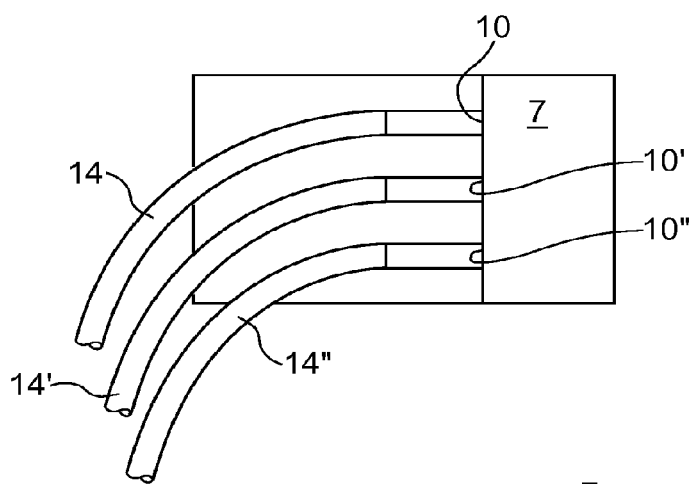
Figure 3C:
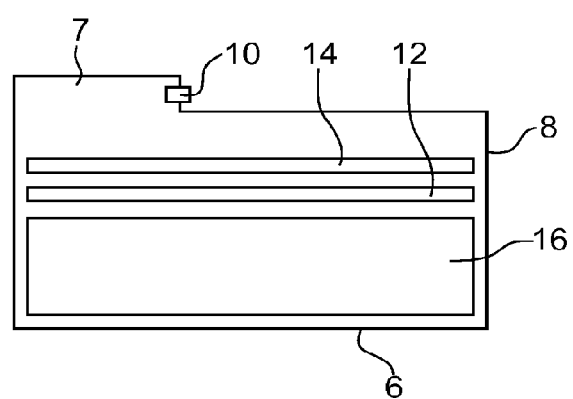
Figure 3D:
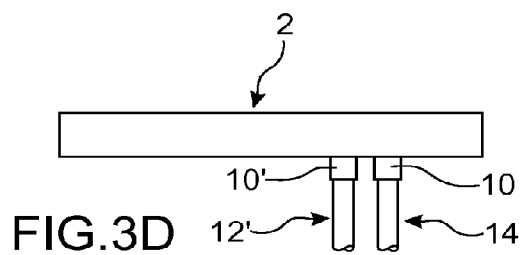
Figure 4:
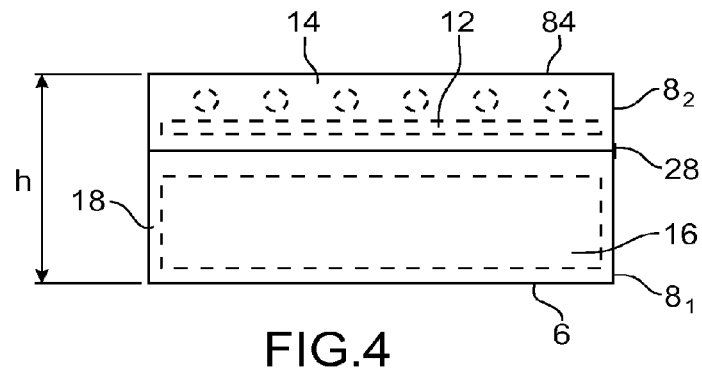
Figure 5A:
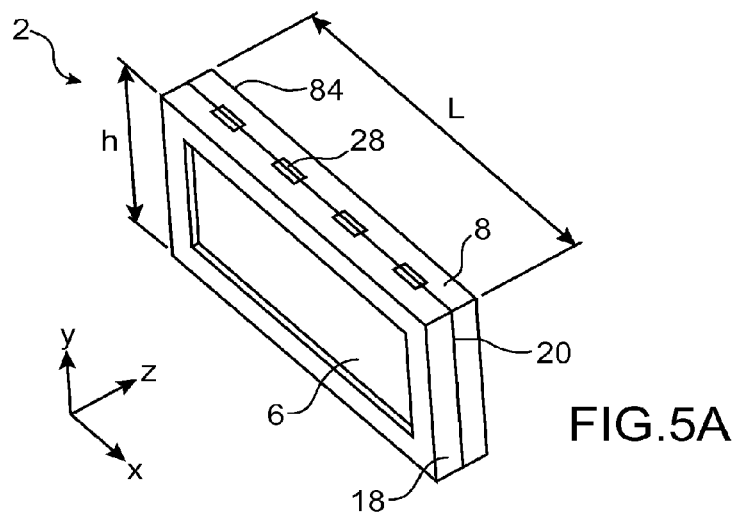
Figure 5B:
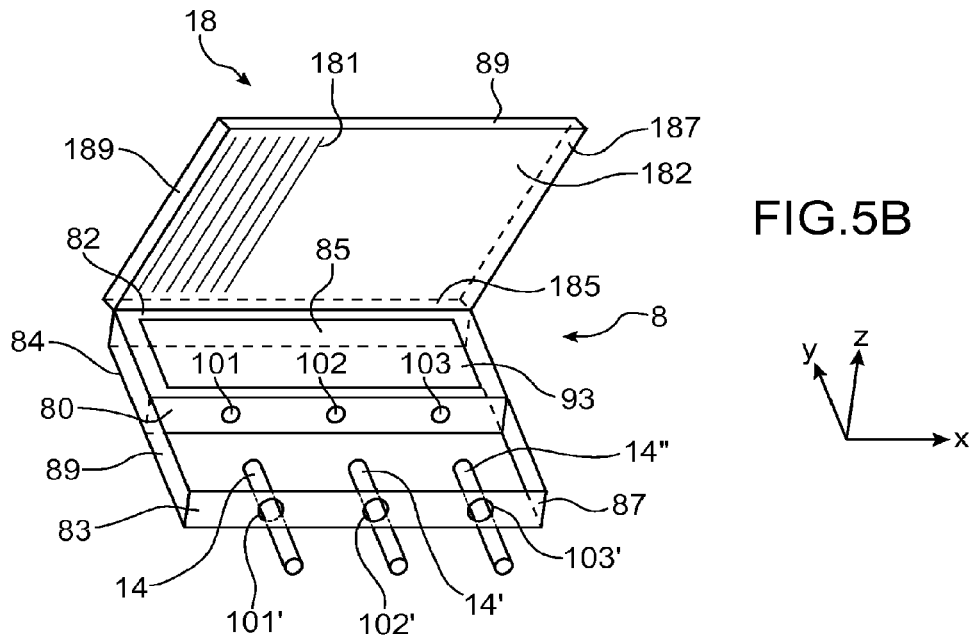
Figure 5C:
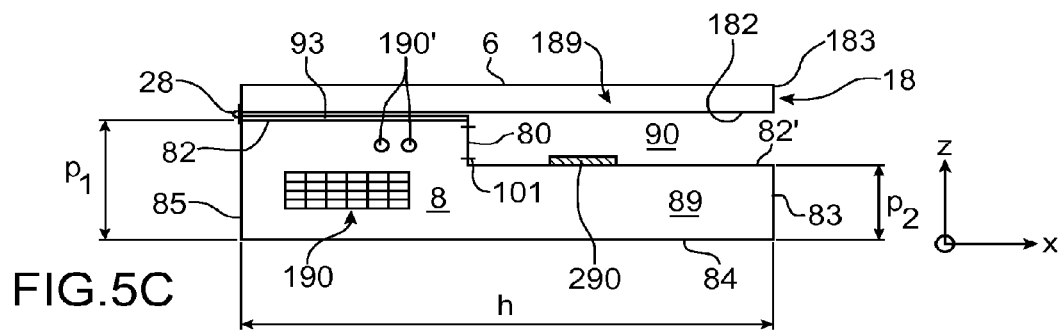
Figure 5D:
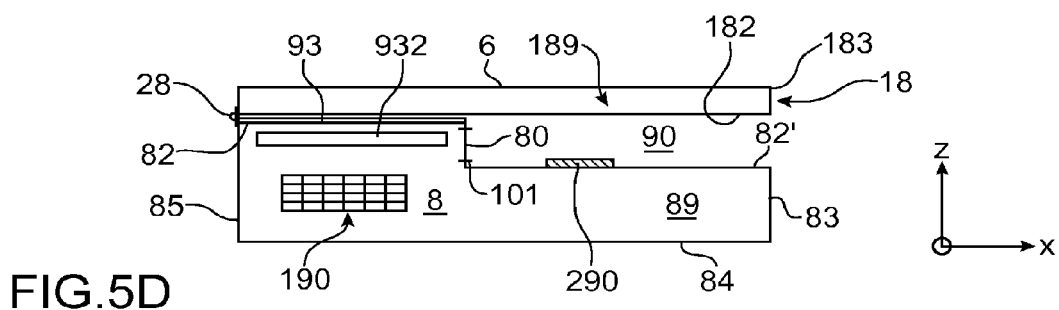
Figure 6:
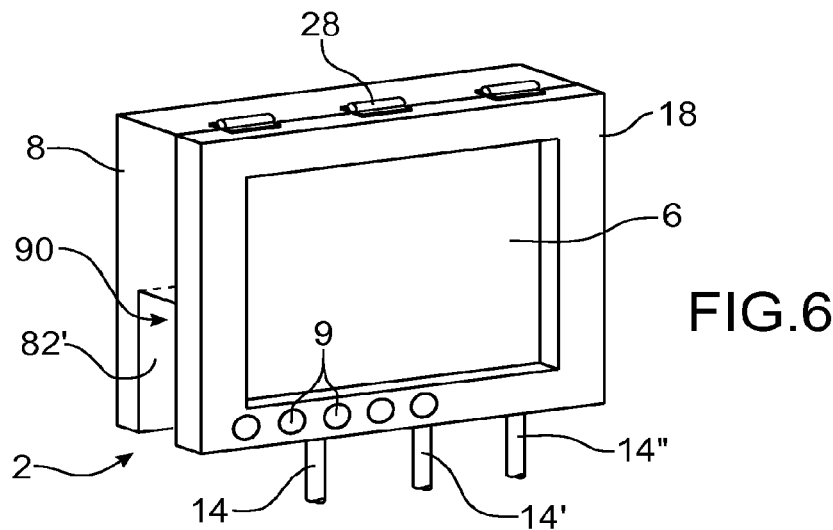
Figure 7A:
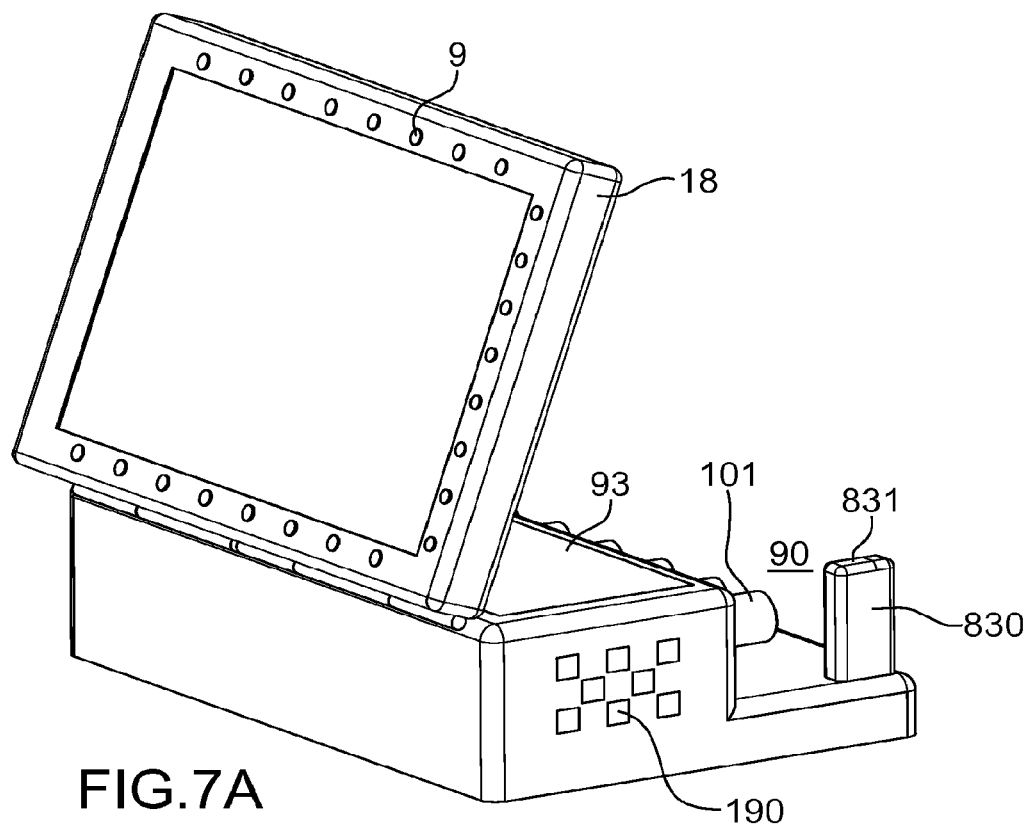
Figure 7B:
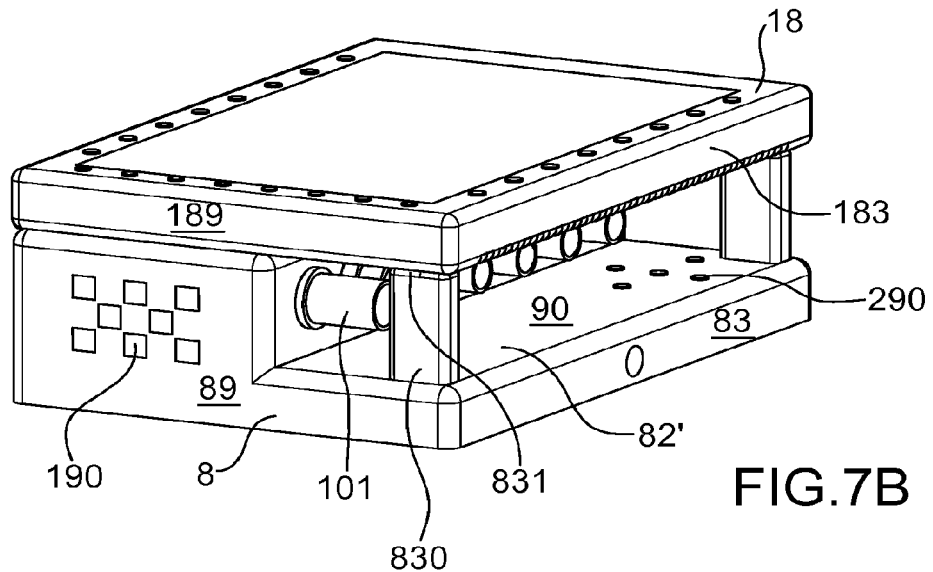
Figure 7C:
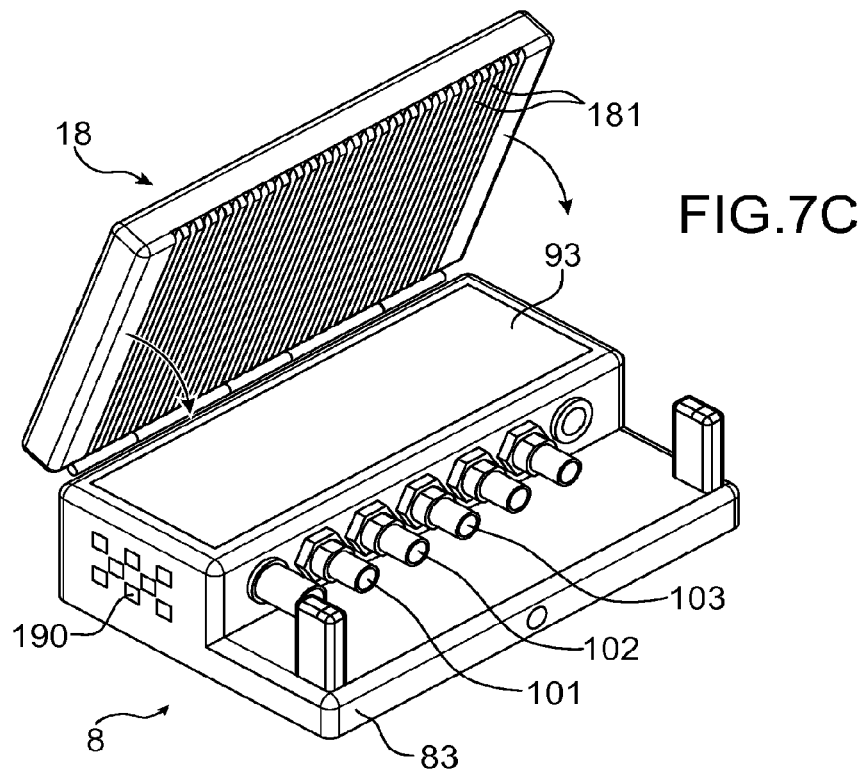
Figure 9:
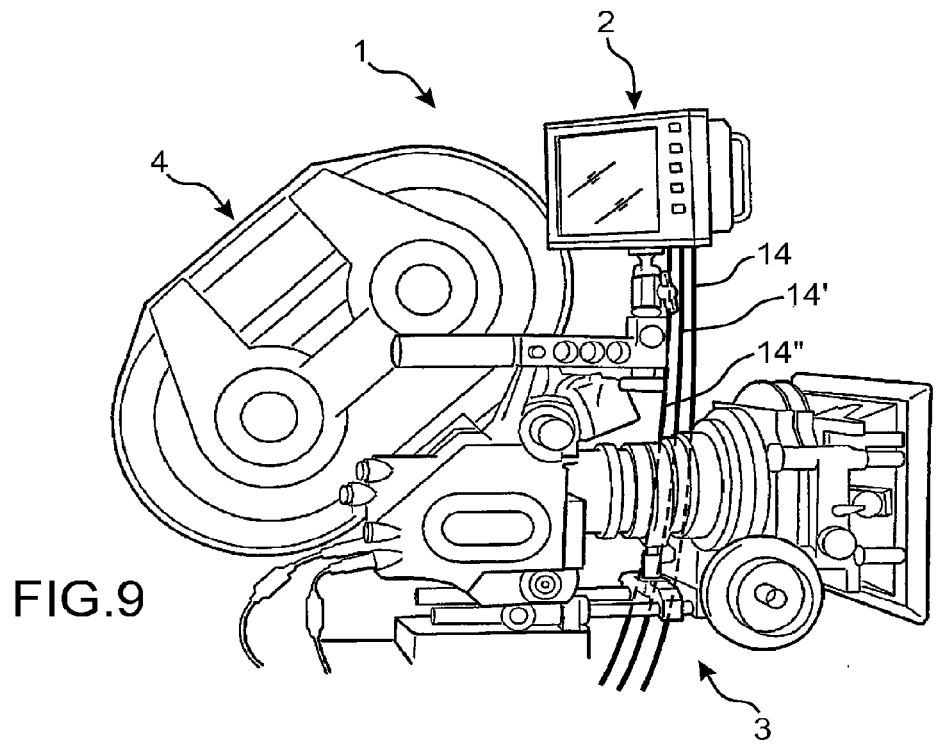
Figure 10:
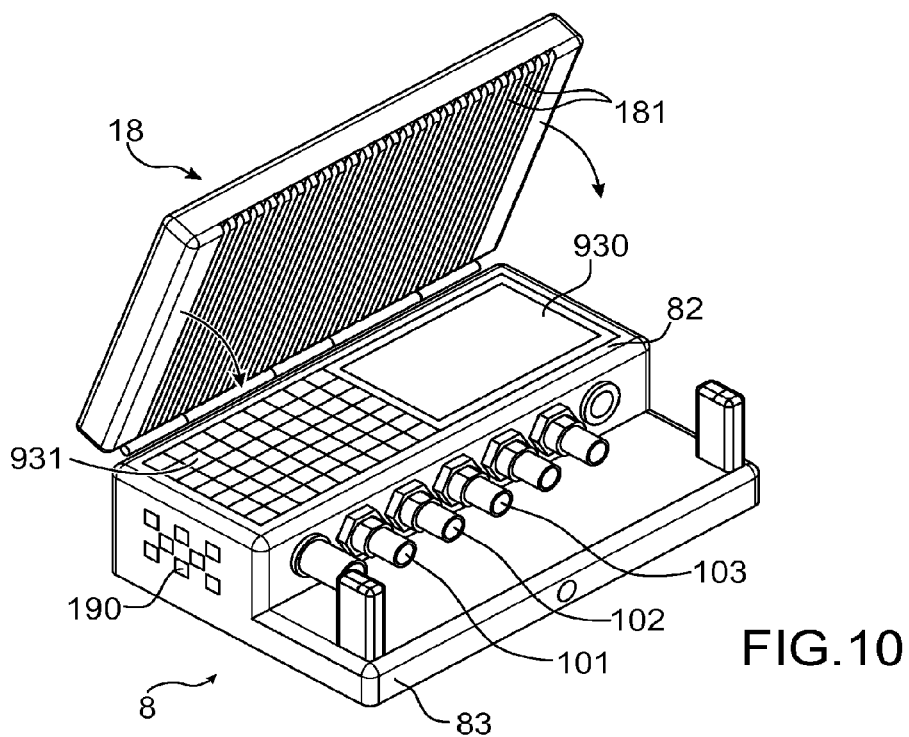
Figure 11A:
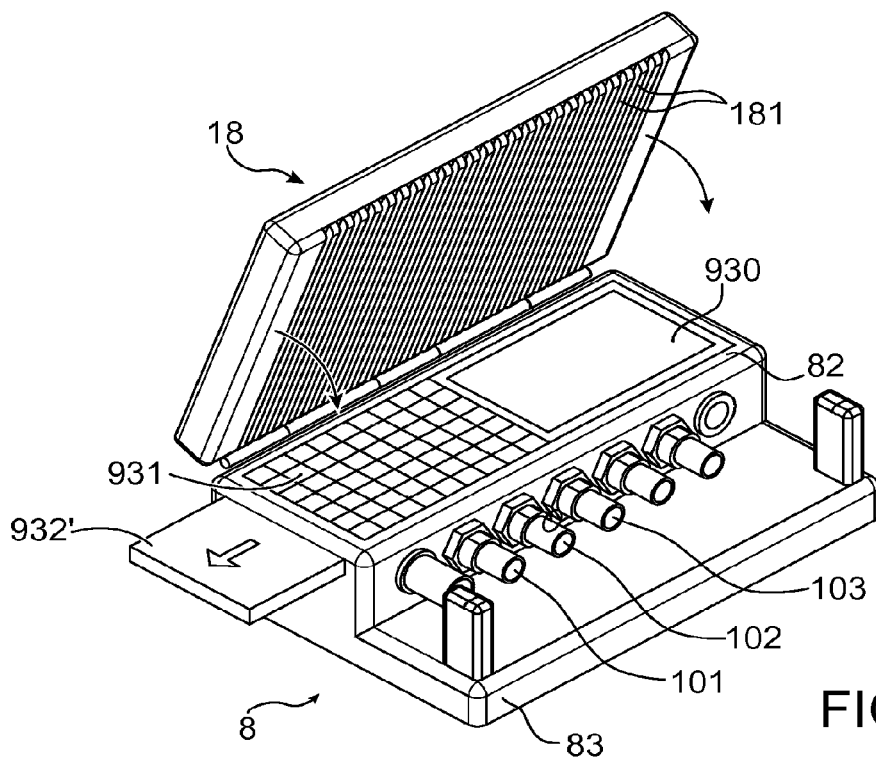
FIG. 11A illustrates such an embodiment incorporating these different elements, with a touchscreen or keyboard 932 in the side outlet position.
Figure 11B:
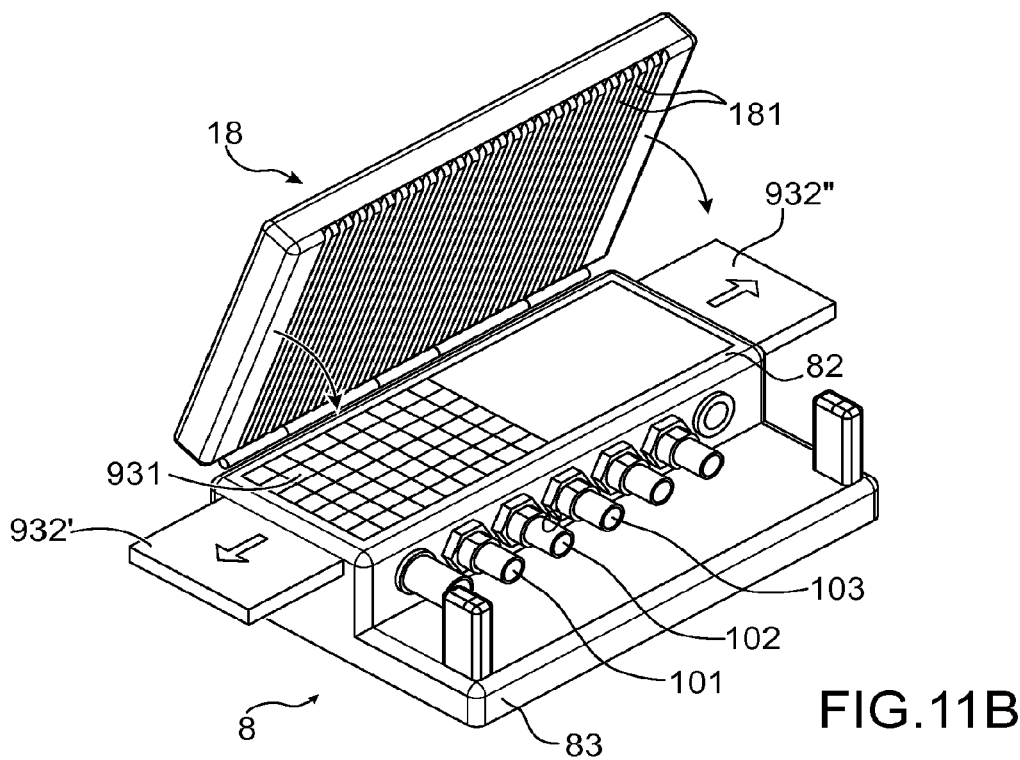
FIG. 11B illustrates another alternative, with two touchscreens 932', 932" in the side outlet position.
Figure 11C:
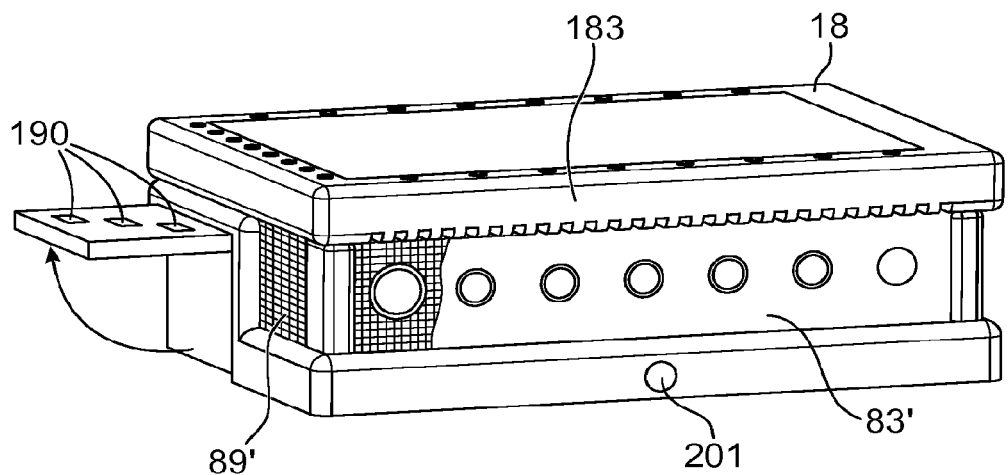

According to another alternative, illustrated in FIG. 11C, a side portion of the device may pivot in order to come into the plane of the surface 82, or into a plane parallel to this surface 82. This side portion is for example the one which bears the control buttons 190, which may also be incorporated in an area of the touchscreen type.

Figure 12:
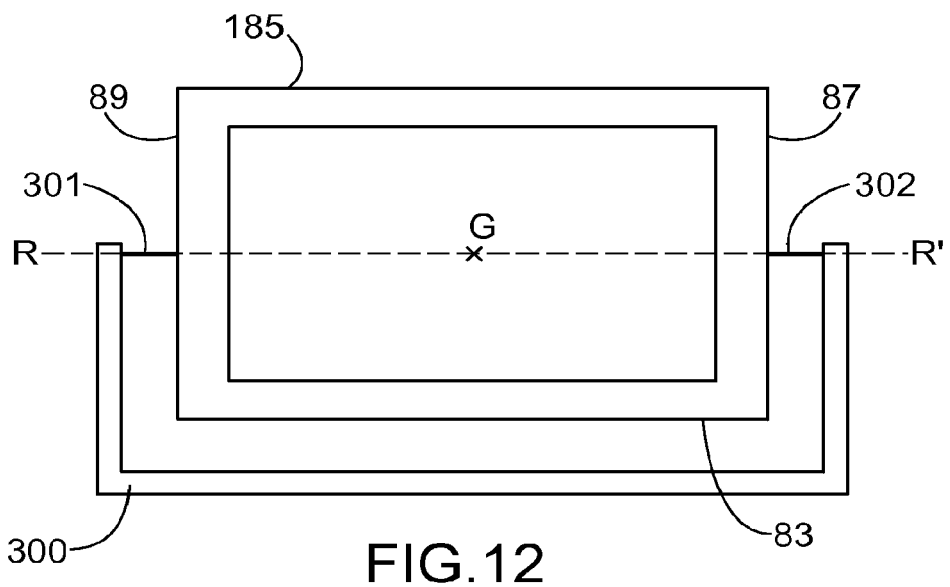

Finally, a screen according to the invention is advantageously positioned on a U-shaped support 300, as illustrated in FIG. 12, with an axis of rotation RR' passing through the centre of gravity G of the screen. Means, for example a tapped hole, are provided for this purpose in each side portion 87, 89 of the device in order to insert therein maintaining elements 301, 302 on this axis RR'.

The invention claimed is:

1. A viewing device including:
    a viewing screen,
    a casing, including a front portion comprising said viewing screen, and a rear portion, and lateral sides, said rear portion comprising one or more electronic cards to process data from a motion picture camera device to be displayed on said viewing screen;
    said front portion comprising a rear face and said rear portion comprising a front face, a part of said front face and a part of said rear face delimiting, in a closed position of the device, an internal gap of the casing, further delimited by a connecting surface, including at least one connection for a cable,
    means for opening or for closing the casing, by moving said rear portion away from or closer to said front portion, while maintaining both of said rear portion and said front portion attached to each other through one face of said rear portion and one face of said front portion, said one face of said rear portion and one face of said front portion forming a first lateral side of said lateral sides of the casing in said closed position of the device,
    a second lateral side of said lateral sides of the casing, opposite to said first lateral side, further including at least one opening for letting through at least one cable to be connected to said at least one connection.

2. The device according to claim 1, wherein said means for closing or for opening the casing includes at least one hinge on at least one of said lateral sides of the casing.

3. The device according to claim 1, further comprising at least one adjustment button positioned inside the casing and/or on a lateral side portion or internal portion of said casing.

4. The device according to claim 1, wherein said rear face of said front portion further comprises heat dissipation means and/or said front face of said rear portion further comprises thermal insulation means.

5. The device according to claim 1, wherein said means for closing or opening the casing include or containing electric connections between said front portion and said rear portion.

6. The device according to claim 1, wherein at least one side portion of the rear portion is openworked or completely open.

7. The device according to claim 1, wherein a rear face of the rear portion includes means for attaching peripheral means.

8. The device according to claim 1, wherein said means for closing or for opening the casing allowing the front portion and the rear portion of the casing to rotate about an axis on one of said lateral sides of the casing.

9. The device according to claim 1, wherein said front face of the rear portion comprises at least one second screen and/or one keyboard.

10. The device according to claim 1, further comprising at least one second screen and/or keyboard retractable in the device, and being able to be in an open position beyond a side face of the device.

11. The device according to claim 1, further comprising at least one second screen and/or keyboard mounted in rotation about an axis of a lateral side of said casing, said at least one second screen and/or keyboard being retractable in a position parallel to one of said lateral sides of said casing, and being able to be opened beyond said lateral side.

12. The device according to claim 1, said casing having a center of gravity and further comprising a support means for positioning said device in rotation about an axis (RR') passing through said center of gravity.

13. The device according to claim 1, wherein a rear face of the rear portion includes means for attaching at least one battery.

14. Motion picture equipment, including said camera and a device according to claim 1.

15. Digital motion picture equipment including a camera and a device according to claim 1.

16. A viewing device including
a viewing screen,
means for producing an image on the screen from a motion picture camera device,
a casing, including a front portion, comprising said viewing screen, and a rear portion, and lateral sides, said rear portion comprising;
said front portion including a rear face and said rear portion including a front face, a part of said front face and a part of said rear face delimiting, in a closed position of the device, a gap internal to the device, further delimited by a connecting surface, including at least one connection for a cable, said connecting surface being substantially perpendicular to said rear face and to said front face when the device is in said closed position,
means for opening or for closing the casing, by moving said rear portion away from or closer to said front portion, while maintaining both of said rear portion and said front portion attached to each other through one face of said rear portion and one face of said front portion, said one face of said rear portion and one face of said front portion forming a first lateral side of the casing in the closed position of said casing,
a second lateral side of said lateral sides the casing, opposite to said first lateral side, further including at least one opening for letting through at least one cable to be connected to said at least one connection.

17. The device according to claim 16, said means for producing an image on the screen from a motion picture camera device comprising one or more electronic cards disposed in said rear portion of the device.

18. The device according to claim 16, wherein said means for closing or for opening the casing comprise at least one hinge on at least one of said lateral sides portion of the casing.

19. The device according to claim 16, further comprising at least one adjustment button positioned inside the casing and/or on a lateral side or internal portion of said casing.

20. The device according to claim 16, wherein said rear face of said front portion further comprises heat dissipation means and/or said front face of said rear portion further comprises at least one thermal insulation means.

21. The device according to claim 16, wherein said means for closing or opening the casing include or contain electric connections between said front portion and said rear portion.

22. The device according to claim 16, wherein at least one side portion of the rear portion is openworked or completely open.

23. The device according to claim 16, wherein a rear face of said rear portion comprises means for attaching peripheral means, for example at least one battery.

24. The device according to claim 16, wherein said front face of said rear portion comprises at least one second screen and/or one keyboard.

25. The device according to claim 16, further comprising at least one second screen and/or keyboard retractable in the device, and being able to be in an open position beyond a lateral side of the casing.

26. The device according to claim 16, further comprising at least one second screen and/or keyboard mounted in rotation about an axis of one of said lateral sides of said casing, said at least one second screen and/or keyboard being retractable in the device, in a position parallel to one of said lateral sides of the device, and being able to be opened beyond said lateral side.

27. The device according to claim 16, said device having a center of gravity and further comprising a support for positioning said device in rotation about an axis passing through said center of gravity.

28. Motion picture equipment, including said camera and a device according to claim 16.

29. Digital motion picture equipment including a camera and a device according to claim 16.

* * * * *